United States Patent Office 3,705,869
Patented Dec. 12, 1972

3,705,869
SOLUBLE POLYIMIDES
Franklin P. Darmory and Marianne Di Benedetto, Ardsley, N.Y., assignors to Ciba-Geigy Corporation, Greenburgh, N.Y.
No Drawing. Filed Nov. 30, 1971, Ser. No. 203,469
Int. Cl. C08g 51/26, 51/44
U.S. Cl. 260—30.2 R
25 Claims

ABSTRACT OF THE DISCLOSURE

Polyimides are prepared by reacting an aromatic tetracarboxylic acid dianhydride with a diamine having the formula

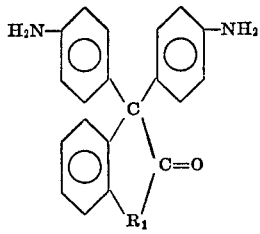

wherein $R_1$ is S, N—H, N-lower alkyl, N-aryl. These polyimides are soluble in certain organic solvents whereby they can be fabricated into films, coatings, laminates and the like. The polyimides are also fusible and moldings thus obtained are low in void content.

DETAILED DISCLOSURE

This invention relates to novel soluble aromatic polyimides which are characterized by a recurring unit having the following structural formula:

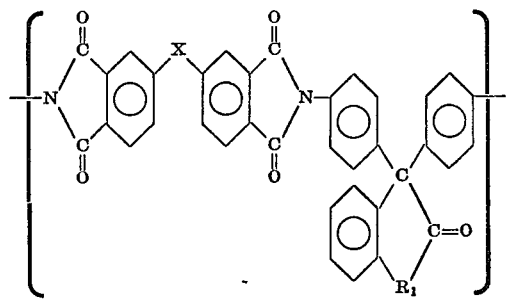

wherein $R_1$ is S, NH, N-(lower)alkyl or N-aryl; and X is —O—, —S—, —CO—

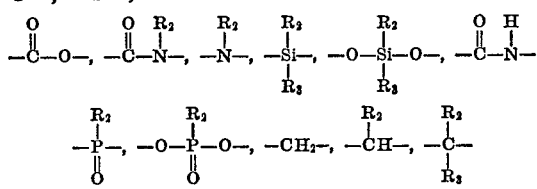

and phenylene; where $R_2$ and $R_3$ are (lower)alkyl of from 1 to 6 carbon atoms and aryl, and the polyamide acids from which they are derived. The (lower) alkyl group employed herein include both straight and branched chain alkyl groups having up to six carbon atoms. Examples of such groups are methyl, ethyl, propyl, isopropyl, butyl, pentyl, hexyl and the like.

The aryl groups of $R_1$, $R_2$ and $R_3$ include phenyl; phenyl substituted with one or more alkyl groups, such as methyl, ethyl, propyl or with one or more halogen groups such as chlorine or bromine; naphthyl, anthryl, phenanthryl and preferably phenyl.

The polyimides produced according to this invention are characterized by useful solubility in certain organic solvents. Polyimides heretofore known to the art have generally been extremely insoluble, and have not been shapeable after conversion from the polyamide-acid state to the polyimide form. The polyimides of the invention are extremely useful in that they can be dissolved in certain solvents, in relatively high concentration, and the solutions can be employed for further fabrication of the polyimides. In this way, it is possible to produce polyimide films, coatings and the like without the necessity of using a polyamide-acid intermediate with a follow-on conversion step. This is highly advantageous, because it permits the application of polyimide coatings to articles which might be damaged by heating or chemical conversion techniques heretofore necessary.

The soluble polyimides display excellent physical, chemical and electrical properties which render them capable of being used as adhesives, laminating resins for printed circuit boards, fibers, coatings for decorative and electrical purposes, films, wire enamels and molding compounds.

These polyimides have been found to be soluble to the extent of at least 20% by weight at a temperature of about 25° C. in common polyamide type solvents such as N-methylpyrrolidone, dimethylacetamide, hexamethylphosphoramide, dimethylsulfoxide, dimethylformamide and the like, as well as solvents such as cyclic ethers as represented by dioxane and tetrahydrofuran; chlorinated hydrocarbons such as methylene chloride, trichloromethane, tetrachloroethane, 1,1,2-trichloroethane, and the like; phenolic type solvents such as cresol, phenol, chlorinated phenol and the like; and solvents such as nitrobenzene and pyridine.

The polyimides are prepared by reacting an aromatic tetracarboxylic acid dianhydride of the formula

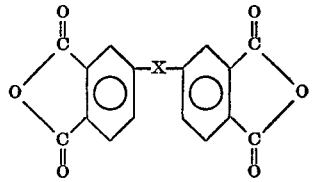

wherein X is as defined previously, with a diamine having the formula

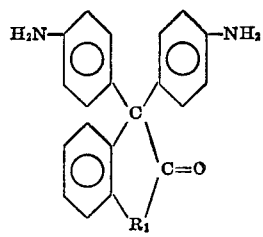

wherein $R_1$ is as defined above; in an organic reaction medium which is a solvent for at least one of the reactants, preferably under substantially anhydrous conditions, at a temperature below 100° C. and preferably at 20° C. to 50° C. The product of this reaction is a polyamide acid represented by the following formula:

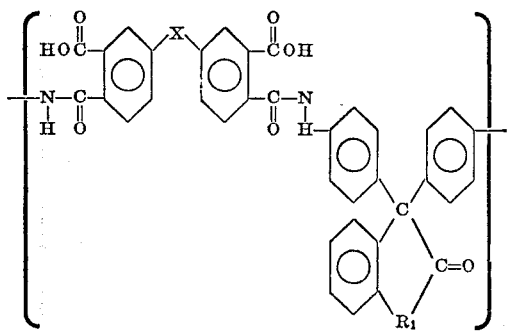

wherein $R_1$ and X are as defined above.

The polyamide acid is subsequently converted to the polyimide by several methods which include heating the polyamide acid solution at temperatures between 100° C. and 240° C. depending on the boiling point of the organic solvent, until imidization is complete; by chemical means e.g. by adding to the polyamide acid solution a dehydrating agent such as acetic anhydride alone or in combination with a tertiary amine catalyst such as pyridine and optionally heating or not heating the resulting solution at about 120° C. until imidization is complete.

More specifically the preparation of the polyamide acid which is subsequently converted to the polyimide can be conveniently carried out in a number of ways. The diamines and dianhydrides can be premixed as dry solids in equivalent amounts and the resulting mixture can be added, in small portions and with agitation, to an organic solvent. Alternately, this order of addition can be reversed i.e. after premixing the diamine and the dianhydride the solvent may be added to the mixture with agitation. It is also possible to dissolve the diamine in the solvent while agitating and to add slowly the dianhydride in portions that provide a controllable rate of reaction. However, this order of addition can also be varied. Still another process involves dissolving the diamine in one portion of a solvent and the dianhydride in another portion of the same or another solvent and then mixing the two solutions.

The degree of polymerization of the polyamide acid and its corresponding polyimide is subject to deliberate control. The mole ratio of diamine to dianhydride in the initial reaction mixture may range from 2:1 to 1:2. The use of equimolar amounts of the reactants under the prescribed additions provides polymers of very high molecular weight while the use of either reactant in large excess limits the extent of the polymerization. However, the scope of this invention includes both high and low molecular weight polyamide acids and their corresponding polyimides.

The low molecular weight polymers can further be utilized as intermediate prepolymers which can be reacted with the appropriate chain extending agents to yield polymers which are useful as adhesives, and as molding and laminating resins. The low molecular weight polymers may be end capped with reactive functional group compounds such as nadic anhydride, maleic anhydride, methylnadic anhydride and the like, and subsequently heated to induce cross-linking and chain extension.

Besides using an excess of one reactant to limit the molecular weight of the polymers, a chain terminating agent such as phthalic anhydride or aniline may be used to cap the ends of the polymer chains.

To effect the conversion of the polyamide acids to the polyimides, the polyamide acids are heated above 50° C. and preferably in an inert atmosphere and more preferably in an inert atmosphere between 110° C. and 240° C. In the preferred process, the polyamide acids are prepared at a temperature below 50° C. and maintained at this temperature until maximum viscosity denoting maximum polymerization is obtained. The polyamide acid in solution and under an inert atmosphere is subsequently heated to about 110° C. to 240° C. to convert the polyamide acid to the polyimide. The soluble polyimide may be alternatively prepared by mixing the diamine and the dianhydride at room temperature in a solvent such as nitrobenzene and then rapidly heating the mixture to reflux for about 2 to 12 hours.

The starting aromatic diamines may be prepared by the following route

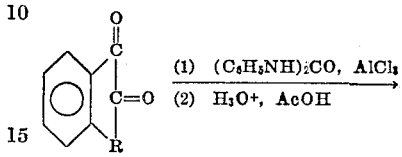

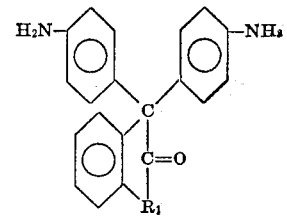

wherein $R_1$ is as previously defined.

The first step may be run at about 100° C. in a solvent such as nitrobenzene for a period of from 2 to 24 hours. The second step is conducted at reflux from 2 to 48 hours.

The soluble polyimides can be precipitated from their solutions by use of methanol, water, spray drying and the like. The resulting granular material can be molded or redissolved in a suitable solvent to yield a film-forming or varnish type composition. Other appropriate ingredients can be added to the polyimide solutions or molding powders including fillers, dyes, pigments, thermal stabilizers and the like, depending on the end use.

It has also been found that these polyimdies when heated above 225° C. in the atmosphere will crosslink without the elimination of volatiles, yielding a polyimide which is essentially insoluble. Thus, these polyimides have the added advantage of being soluble and fusible during the fabrication stages and can be made insoluble if desired by appropriately heating the completely fabricated product under atmospheric conditions at temperatures of greater than 225° C. This cross-linking is believed to result from oxidation reactions although the exact nature of the cross-linking is not definitely known.

Thus, these polyimides are especially well suited for film, wire enamel and laminating applications wherein the polyimides can be coated onto the substrate from cold or hot solutions at a solid concentration of from 25% to 50% by weight solids and cross-linked to yield coatings which are impervious to the solvents in which they were once soluble.

The quantity of organic solvent used in the preferred process need only be sufficient to dissolve enough of one reactant, preferably the diamine, to initiate the reaction of the diamine and the dianhydride. For forming the composition into shaped articles, it has been found that the most successful results are obtained when the solvent represents at least 60% of the polymeric solution. That is, the solution should contain 0.05–40% of the polyimide component. The viscous solution of the polymeric composition containing 10% to 40% polyimide in the polymeric component dissolved in the solvent may be used as such for forming shaped structures.

To further illustrate the nature of this invention and the process employed in preparing the soluble polyimides, the following examples are given below:

EXAMPLE 1

3,3-di-(p-aminophenyl)oxindole

A solution of 7.36 g. (0.05 mole) of isatin, 12.7 g. (0.06 mole) of s-diphenylurea and 40 g. (0.30 mole) of aluminum chloride in 200 ml. of nitrobenzene was maintained at 100° C. for 16 hours. The cooled solution was poured into 1 l. of ice water and 600 ml. of hexane. Filtration gave a solid which was suspended in 200 ml. of acetic acid and treated with 5 ml. of water and 200 ml. of sulfuric acid. This solution was refluxed for 24 hours, cooled, and filtered. The filtrate was treated with 40 g. of sodium carbonate, concentrated in vacuo, and takenup in 300 ml. of boiling 1 N hydrochloric acid. This solution was diluted with 300 ml. of water cooled to 5° C., filtered, and made basic with ammonia. The collected solid was recrystallized from dioxane-hexane to yield 14.9 g. (95%) of product which had a M.P. of 265–267.5° C.

Calcd. for $C_{20}H_{17}N_3O$ (percent): C, 76.17; H, 5.43; N, 13.32. Found (percent): C, 76.16; H, 5.58; N, 12.75.

In a similar manner 3,3-di-(p-aminophenyl)-thionaphthenone was prepared by substituting for isatin in the above procedure an equivalent amount of thioisatin. The product had a melting point of 195° C.–197° C.

Calcd. for $C_{20}H_{16}N_2OS$ (percent): C, 71.83; H, 5.43; N, 8.38; S, 9.59. Found (percent): C, 71.72; H, 5.04; N, 8.30; S, 9.58.

EXAMPLE 2

3,3-di-(p-aminophenyl)-1-phenyl oxindole (a) To a solution of 1590 g. (12.5 moles) of oxalyl chloride in 20 l. of dry methylene chloride at 0° was added, with stirring, a solution of 2115 g. (12.5 moles) of diphenylamine in 10 l. of dry methylene chloride.

After the addition was completed, the mixture was brought to room temperature and stirred for 18 hrs. The solution was then concentrated in vacuo. The residual oil was taken up in 30 l. of nitrobenzene, and this solution was treated with 3340 g. (25 moles) of aluminum chloride. This solution was then heated, with stirring, at 120° C. for 4 hours. Vigorous hydrogen chloride evolution occurred throughout this operation.

(b) The cooled solution from step (a) was treated with 3000 g. (14.1 moles) of s-diphenylurea and an additional 3340 g. (25 moles) of aluminum chloride. The mixture was maintained, with stirring, at 100° C. for 18 hours.

The cooled solution was poured, with vigorous stirring, into a mixture of 100 l. of hexane and 100 l. of water. The precipitated solid was collected and washed with 10 additional liters of hexane to remove all residual nitrobenzene.

The collected solid was suspended to 50 l. of acetic acid and treated with 0.5 l. of water and 9 l. of concentrated sulfuric acid. The mixture, which became homogeneous on heating, was then refluxed for 18 hours.

The cooled solution was filtered, and the filter cake was washed with 2 l. of acetic acid. The combined filtrates were then treated carefully with 16 kg. of sodium carbonate and concentrated, in vacuo, to dryness. The remaining solids were taken up in 100 l. of boiling 1 N hydrochloric acid. The solution was cooled and filtered.

The filtrate was made basic with concentrated ammonium hydroxide and the precipitated solid was collected. The crude diamine was recrystallized from 50 l. of methyl Cellosolve with Darco decolorization (use 1 kg.) and water (70 l.) precipitation. The product had an M.P. of 276–278° C.

Calcd. for $C_{26}H_{21}N_3O$ (percent): C, 79.77; H, 5.41; N, 10.74. Found (percent): C, 78.87; H, 5.65; H, 10.45.

By essentially following the above procedure, and substituting for diphenylamine an equivalent amount of N-methylaniline and N-propylaniline there is respectively obtained 3,3-di-(p-aminophenyl)-1-methyl oxindole and 3,3-di-(p-aminophenyl)-1-propyl oxindole.

EXAMPLE 3

To a solution of 0.01 mole of 3,3-di-(p-aminophenyl)-1-phenyl-oxindole in 45 ml. of distilled N-methyl pyrrolidone, under nitrogen, was added 3.222 g. (0.01 mole) of 3,4,3',4' - tetracarboxylic benzophenone dianhydride (BTDA) in portions over a 15 min. period. The solution was then stirred for about 15 hours at room temperature and under nitrogen.

The reaction vessel was then immersed in a 200° C. oil bath. Thermal equilibrium was rapidly established at 185° C., and the reaction mixture was maintained at that temperature for 3 hours. The reaction vessel was swept out by a strong nitrogen flow during the first few minutes of the imidization so as to remove all traces of water formed in the reaction. The vessel was again swept out after 10 minutes, 30 minutes and 1 hour.

The soluble polyimide thus obtained had an intrinsic viscosity of 0.60 in N-methylpyrrolidone at 30° C. and a glass transition temperature of 355° C. as determined by torsional braid analysis.

Films were cast from the polyimide solution onto glass and aluminum and heated in a forced air oven at 200° C. for 1 hour to drive off the solvent. The coatings obtained were clear, tough, and flexible and all the coatings were able to be dissolved in the solvent from which they were prepared.

When the same coatings were heated to 300° C. for one half hour, they were still tough, clear and flexible; however, they were no longer soluble.

The polyimide was aged isothermally in a forced air oven at 300° C. The percent weight loss was minor after 600 hours.

The polyimide powder which was obtained by precipitation from solution with acetone and dried in a vacuum oven at 80° C. was soluble as a 25% solids solution in chloroform and dioxane respectively.

EXAMPLE 4

To a solution of 0.01 mole of 3,3-di-(p-aminophenyl) oxindole in 45 ml. of distilled N-methyl pyrrolidone, under nitrogen, was added 3.222 g. (0.01 mole) of BTDA in portions over a 15 minute period. The solution was then stirred for about 15 hours at room temperature and under nitrogen.

The reaction vessel was then immersed in a 200° C. oil bath. Thermal equilibrium was rapidly established at 185° C., and the reaction mixture was maintained at that temperature for 3 hours. The reaction vessel was swept out by a strong nitrogen flow during the first few minutes of the imidization so as to remove all traces of water formed in the reaction. The vessel was again swept out after 10 minutes, 30 minutes and 1 hour.

The soluble polyimide thus obtained had an intrinsic viscosity of 0.39 N-methyl pyrrolidone at 30° C. and a glass transition temperature of 380° C. as determined by torsional braid analysis.

The polyimide may be obtained in powder form by precipitating the polyimide from solution using acetone and drying the powder under vacuum at 80° C.

The powder may be molded by heating the powder in a cavity mold at 410° C. and a pressure of about 5000 p.s.i.

EXAMPLE 5

To a solution of 0.01 mole of 3,3-di-(p-aminophenyl)-thionaphthenone in 45 ml. of distilled N-methyl pyrrolidone, under nitrogen, was added 3.222 g. (0.01 mole) of BTDA in portions over a 15 minute period. The solution was then stirred for about 15 hours at room temperature and under nitrogen.

The reaction vessel was then immersed in a 200° C. oil bath. Thermal equilibrium was rapidly established at 185° C., and the reaction mixture was maintained at that temperature for 3 hours. The reaction vessel was swept out by a strong nitrogen flow during the first few minutes of the imidization so as to remove all traces of water formed in the reaction. The vessel was again swept out after 10 minutes, 30 minutes and 1 hour.

The soluble polyimide thus obtained had an intrinsic viscosity of 0.372 in N-methyl pyrrolidone at 30° C. and a glass transition temperature of 320° C. as determined by torisonal braid analysis.

Laminates may be prepared from this soluble polyimide for use as printed circuit boards by coating 7628 fiber glass cloth with the resin solution. Dry the coated fiber glass in a vacuum oven at 80° C. for 2 hours. Cut the prepreg into squares and lay up in a press preheated to 150° C. to form a 13 ply laminate and hold for 15 minutes. Apply 500-1000 p.s.i. to the laminate, then slowly raise the temperature to 215° C. Hold this temperature and pressure for 2 hours, then increase over a 1 hour period to 275° C. Hold at 275° C. for 1 hour, then heat to 360° C. and hold for 15 minutes. Cool under pressure to 160° C.

EXAMPLE 6

To a solution of 0.01 mole of 3,3-di-(p-aminophenyl)-1-methyl-oxindole in 45 ml. of distilled N-methyl pyrrolidone, under nitrogen, is added 3.222 g. (0.01 mole) of BTDA in portions over a 15 minute period. The solution is then stirred for about 15 hours at room temperature and under nitrogen.

The reaction vessel is then immersed in a 200° C. oil bath. Thermal equilibrium is rapidly established at 185° C., and the reaction mixture is maintained at that temperature for 3 hours. The reaction vessel is swept out by a strong nitrogen flow during the first few minutes of the imidization so as to remove all traces of water formed in the reaction. The vessel is again swept out after 10 minutes, 30 minutes and 1 hour.

A soluble polyimide is obtained which may be further converted to a molding powder by coagulation from acetone with high speed stirring.

EXAMPLE 7

To a solution of 0.01 mole of 3,3-di-(p-aminophenyl)-phenyl-oxindole in 45 ml. of distilled N-methyl pyrrolidone, under nitrogen, was added 3.222 g. (0.01 mole) of BTDA in portions over 15 minute periods. The solution was then stirred for about 15 hours at room temperature and under nitrogen. To this solution was added 10 ml. of acetic anhydride and 2.5 ml. of pyridine. The solution was then heated at 120° C. for 3 hours to yield the soluble polyimide.

EXAMPLE 8

A solid mixture of 0.01 mole of 3,3-di-(p-aminophenyl) oxindole and 3.222 g. (0.01 mole) of BTDA in 100 ml. of nitrobenzene was brought to reflux under nitrogen in one hour. The solution was maintained at reflux for 12 hours to yield a soluble polyimide. The polyimide solution may be applied directly as a coating or a wire enamel useful, for example, as electrical wire insulation; or, the polyimide may be isolated by coagulation from acetone and used as a molding powder.

EXAMPLE 9

By essentially following the procedure of Example 3, soluble polyimides may be obtained by reacting equivalent amounts of the following aromatic dianhydride and oxindole diamine derivatives:

(a) bis(3,4-dicarboxyphenyl)ether dianhydride plus 3,3-di-(p-aminophenyl)-1-phenyl oxindole
(b) bis(3,4-dicarboxyphenyl)sulfone dianhydride plus 3,3-di-(p-aminophenyl)oxindole
(c) bis (3,4-dicarboxyphenyl)sulfone dianhydride plus 3,3-di-(p-aminophenyl)-1-phenyl oxindole
(d) bis(3,4-dicarboxyphenyl)methane dianhydride plus 3,3-di-(p-aminophenyl)-thionaphthenone
(e) 1,1-bis(3,4-dicarboxyphenyl)ethane dianhydride plus 3,3-di-(p-aminophenyl)-1-methyl oxindole
(f) 3,4,3',4'-tetracarboxylic phenylbenzoate dianhydride plus 3,3-di-(p-aminophenyl)-1-propyl oxindole
(g) 3,4,3',4'-tetracarboxylic triphenylamino dianhydride
(h) 3,4,3',4'-tetracarboxylic tetraphenylsilane dianhydride plus 3,3'-di-(p-aminophenyl)oxindole
(i) 3,4,3',4'-tetracarboxylic tetraphenylsiloxane dianhydride plus 3,3-di-(p-aminophenyl)-1-phenyl oxindole
(j) 3,4',3',4'-tetracarboxylic triphenylphosphine oxide dianhydride plus 3,3-di-(p-aminophenyl)-thionaphthenone
(k) 3,4,3',4'-tetracarboxylic triphenylphosphate dianhydride plus 3,3-di-(p-aminophenyl)oxindole

What is claimed is:

1. A polyimide consisting essentially of the recurring unit

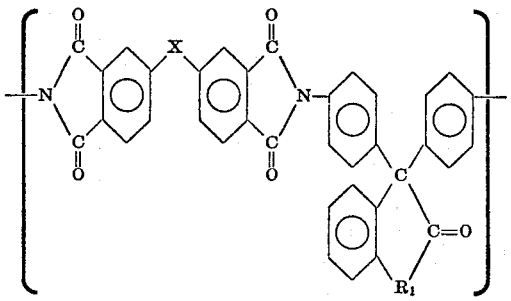

wherein $R_1$ is S, N—H, N-(lower)alkyl or N-aryl, and X is —O—, —S—, —CO—

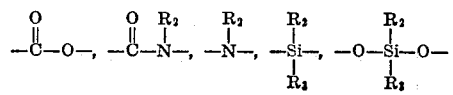

and phenylene, wherein $R_2$ and $R_3$ are (lower) alkyl of from 1 to 6 carbon atoms and aryl.

2. A polyimide according to claim 1, said polyimide consisting essentially of the recurring unit

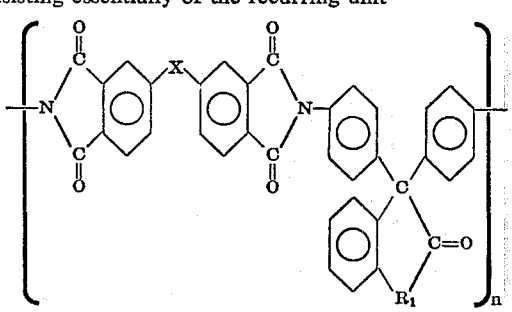

wherein $R_1$ is S, N—H, N-(lower)alkyl or N-aryl, and X is O, $SO_2$, CO

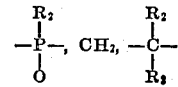

wherein $R_2$ and $R_3$ is lower alkyl of from 1 to 6 carbon atoms or aryl.

3. A polyimide according to claim 1, said polyimide consisting essentially of the recurring unit

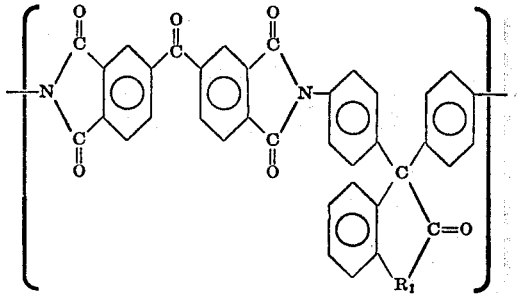

wherein $R_1$ is S, N—H, N-(lower)alkyl or N-aryl.

4. A polyimide according to claim 1, said polyimide consisting essentially of the recurring unit

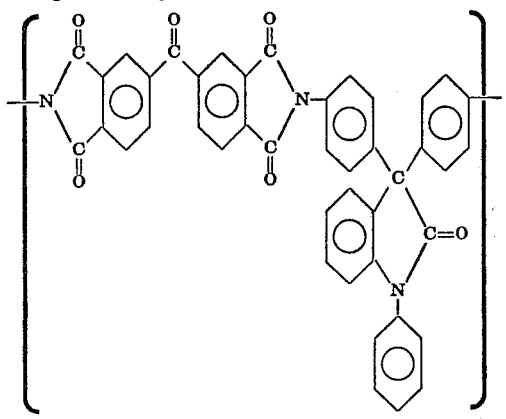

5. A polyimide according to claim 1, said polyimide consisting essentially of the recurring unit

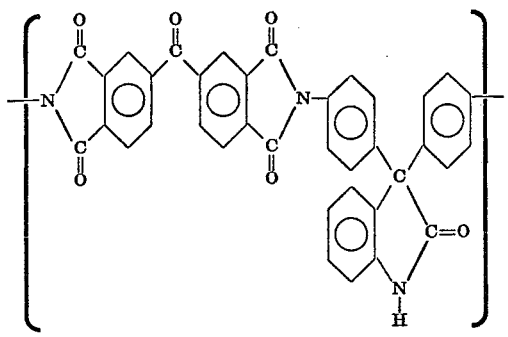

6. A polyimide according to claim 1, said polyimide consisting essentially of the recurring unit

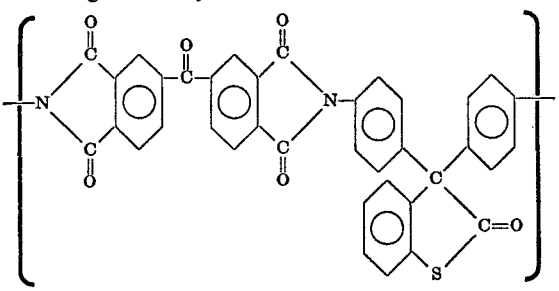

7. A polyamide acid consisting essentially of the recurring unit

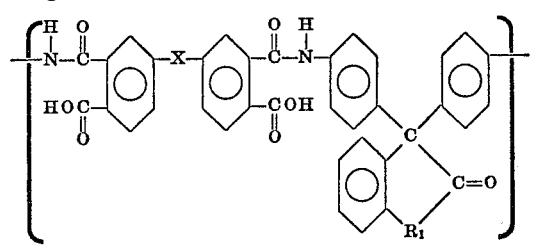

wherein $R_1$ is S, N—H, N-(lower)alkyl, N-aryl; and X is —O—, —S—, —CO—

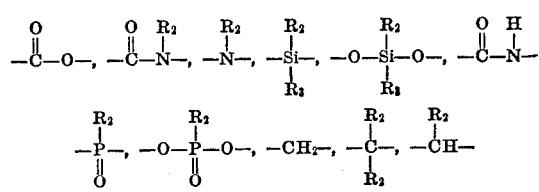

and phenylene wherein $R_2$ and $R_3$ are (lower) alkyl of from 1 to 6 carbon atoms and aryl.

8. A polyamide acid according to claim 7, said polyamide acid consisting essentially of the recurring unit

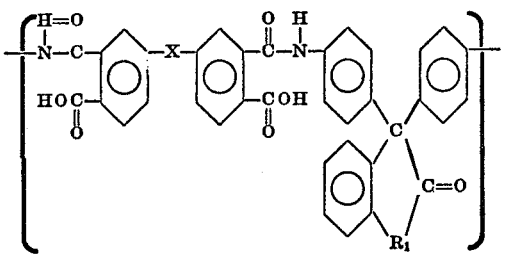

wherein $R_1$ is S, N—H, N—(lower)alkyl, N-aryl; and X is O, $SO_2$, CO

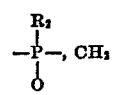

or

wherein $R_2$ and $R_3$ are lower alkyl of from 1 to 6 carbon atoms or aryl.

9. A polyamide acid according to claim 7, said polyamide acid consisting essentially of the recurring unit

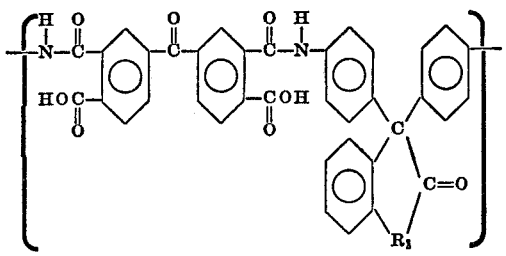

wherein $R_1$ is S, N—H, N-(lower)alkyl, N-aryl.

10. A polyamide acid according to claim 5, said polyamide acid consisting essentially of the recurring unit

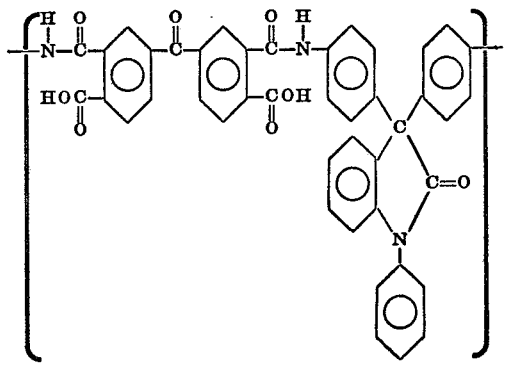

11. A polyamide acid according to claim 5, said polyamide acid consisting essentially of the recurring unit

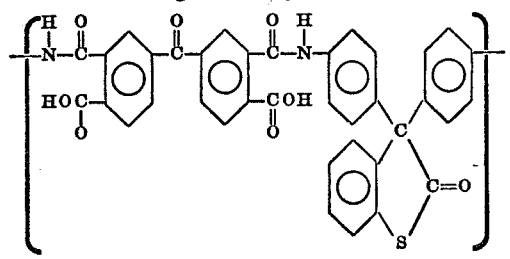

12. A polyamide according to claim 5, said polyamide acid consisting essentially of the recurring unit

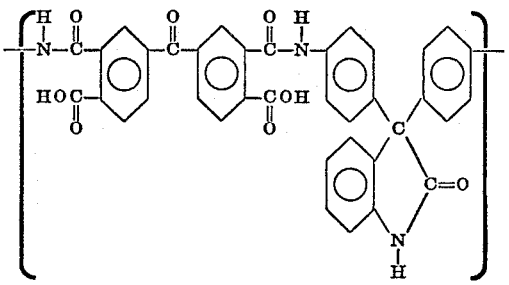

13. A solution of polyimide according to claim 1 in a volatile solvent for said polymer.

14. A solution of a polyimide according to claim 2 in a volatile solvent for said polymer.

15. A solution of a polyimide according to claim 3 in a volatile solvent for said polymer.

16. A solution of a polyimide according to claim 15 wherein said solvent is N-methyl pyrrolidone, dimethylacetamide, dimethylformamide, tetrahydrofuran and dioxane.

17. A solution of a polyamide acid according to claim 7 in a volatile solvent for said polymer.

18. A solution of a polyamide acid according to claim 8 in a volatile solvent for said polymer.

19. A solution of a polyamide acid according to claim 9 in a volatile solvent for said polymer.

20. A solution of a polyimide according to claim 19 wherein said solvent is N-methyl pyrrolidone, dimethylacetamide, dimethylformamide, tetrahydrofuran and dioxane.

21. A self-supporting film consisting essentially of at least one polyimide according to claim 1.

22. A metal article coated with at least one polyimide according to claim 1.

23. An article according to claim 1 in which the metal is copper.

24. A glass fabric or fiber impregnated with at least one polyimide according to claim 1.

25. A molding powder consisting essentially of at least one polyimide according to claim 1.

References Cited

UNITED STATES PATENTS

| | | | |
|---|---|---|---|
| 3,538,056 | 11/1970 | Caldwell | 260—78 |
| 3,539,537 | 11/1970 | Holub | 260—78 |
| 3,563,951 | 2/1971 | Raldman | 260—47 |
| 3,661,849 | 4/1972 | Culberton | 260—47 |

MORRIS LIEBMAN, Primary Examiner

R. H. ZAITLEN, Assistant Examiner

U.S. Cl. X.R.

260—30.4 N, 32.6 N, 47 CP, 78 TF, 326.15 R, 330.5